Figure 1:
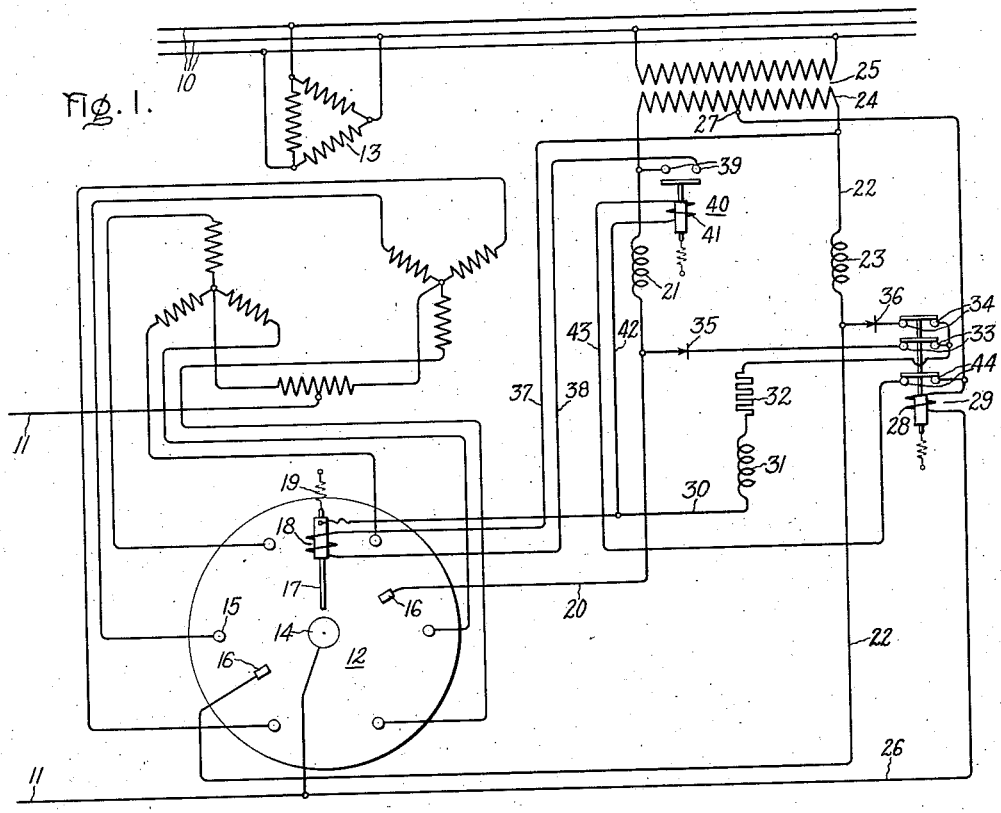

July 30, 1935.   H. T. SEELEY   2,009,819
STARTING SYSTEM FOR ARC DISCHARGE APPARATUS
Filed Oct. 13, 1932   2 Sheets-Sheet 1

Inventor:
Harold T Seeley,
by Charles E Muller
His Attorney.

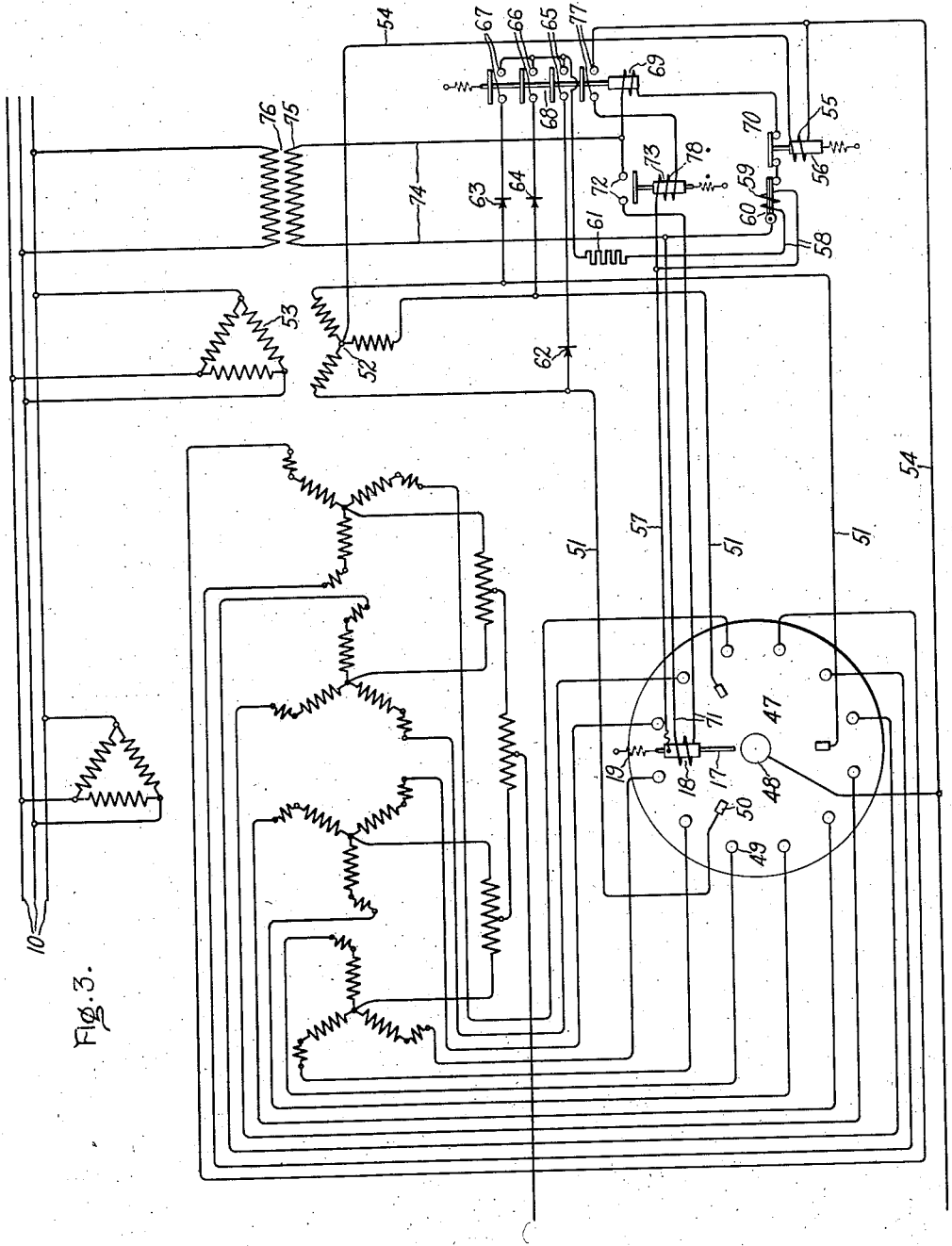

Patented July 30, 1935

2,009,819

UNITED STATES PATENT OFFICE 2,009,819

STARTING SYSTEM FOR ARC DISCHARGE APPARATUS

Harold T. Seeley, Lansdowne, Pa., assignor to General Electric Company, a corporation of New York Application October 13, 1932, Serial No. 637,623

10 Claims. (Cl. 175—363)

My invention relates to arc discharge apparatus such as mercury arc rectifiers or the like provided with main power anodes together with ignition and excitation electrodes, and its principal object is the provision of improved means for and methods of starting such apparatus.

In the operation of mercury arc rectifiers, inverters, and like apparatus, in which an arc discharge passes between a cathode and main or power anodes, it is common practice to provide auxiliary electrodes to initiate or to facilitate the picking up of the arc by the main anodes. For this purpose a starting or ignition electrode or anode is commonly so arranged that the tip thereof may be plunged into the mercury pool forming the cathode and immediately withdrawn, thereby striking an arc between ignition anode and cathode and forming a cathode spot on the mercury surface. Holding or excitation electrodes or anodes, connected to an alternating current source, are further provided to which the arc started by the ignition anode is transferred and which then furnish ionization in the rectifier receptacle or tank for the main or power anodes.

In the starting system above described, as arranged heretofore the ignition anode has been energized by alternating potentials. This arrangement, however, has not proved altogether satisfactory for the reason principally that at the moment the ignition anode is withdrawn from the mercury pool the alternating potential impressed between ignition anode and cathode may be not of the correct polarity or sufficient magnitude to form the starting arc. In general it has been found that in order to form a starting arc which permits the picking up of the arc by the excitation anodes the ignition anode when energized by an alternating potential may be required to operate several times.

In acordance with my invention the above starting difficulties are obviated and starting of the arc discharge apparatus in certain cases made more prompt and effective by impressing a direct-current potential instead of an alternating potential upon the ignition anode. In my improved starting arrangement, at the moment the ignition anode leaves the mercury surface of the cathode in the starting operation a direct-current starting arc is struck and this direct-current arc persists until the alternating-current holding arc to the excitation anodes has picked up. The direct-current starting arc is supplied, in accordance with my invention, from rectifier apparatus which is external to the arc discharge apparatus comprising the main anodes, excitation anodes and ignition anode, this auxiliary rectifier apparatus being connected preferably to the alternating current source which supplies the excitation anodes.

My invention will be better understood from the following description when considered in connection with the accompanying drawings and its scope wil be pointed out in the appended claims.

Figure 2:
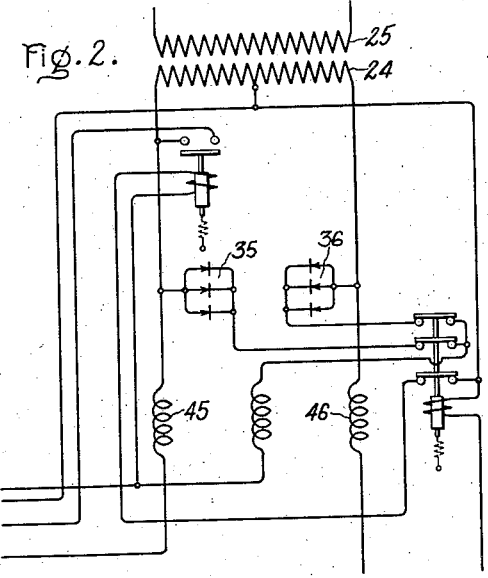

Referring to the drawings, Fig. 1 is a diagrammatical representation of an electric system embodying my invention, in which two excitation anodes operating single-phase are employed; Fig. 2 is a modification of the embodiment shown in Fig. 1; and Fig. 3 is a diagrammatic representation of an embodiment of my invention in which three excitation anodes operating three-phase are employed.

In Fig. 1 my invention is illustrated as embodied in an electric system wherein power is transferred between an alternating current circuit 10 and a direct current circuit 11 through an arc discharge apparatus 12 such as a six-phase mercury arc rectifier connected to the alternating current circuit through a transformer 13. The rectifier 12 comprises a cathode 14, main power anodes 15, two excitation anodes 16, and an ignition anode 17 with which is operatively associated a solenoid 18 adapted when energized to make contact between the ignition anode and the cathode against the tension of a spring 19.

The alternating-current excitation circuit includes the excitation anodes 16 connected respectively through a lead 20 and a reactor 21 and through a lead 22 and a reactor 23 to the opposite terminals of an alternating current source, preferably the secondary 24 of a transformer 25 the primary of which may be connected to the alternating current circuit 10. The excitation circuit is completed from the secondary 24 of transformer 25 to the cathode 14 through a lead 26 connected to the center tap 27 of the secondary 24 and including the operating winding 28 of a relay 29 the purpose of which will be explained hereinafter.

The direct-current ignition circuit in accordance with my invention includes the ignition anode 17, a lead 30, a reactor 31, a resistor 32, contacts 33 and 34 of relay 29, current rectifying means, for example two rectifiers 35 and 36 connected respectively to leads 20 and 22, reactors 21 and 23 connected between rectifiers 35, 36 and secondary 24 of transformer 25, secondary 24, lead 26, and cathode 14.

The circuits whereby the direct-current ignition arc is struck between the ignition anode 17 and the cathode 14 include the ignition anode solenoid 18 which is adapted to be connected across the secondary 24 of transformer 25 through leads 37, 38 and the contacts 39 of a relay 40 the operating winding 41 of which is connected between the rectifiers 35, 36 and the center tap 27 of secondary 24 of transformer 25 through the contacts 33, 34 of relay 29, resistor 32, reactor 31, lead 30, a lead 42, a lead 43, contacts 44 of relay 29, and lead 26.

It will be noted that the energy required to actuate the ignition anode 17 is supplied directly from an alternating current source, as from the power lines 10 through a transformer 25. In usual practice the ignition anode system comprises a long and relatively heavy metal rod held in proper alignment by, and slidable in, bearings mounted on the cover or upper plate of the rectifier tank. This rod is adapted to be pulled downwardly in its bearings against the tension of a return spring, as 19. For positive and dependable operation of the ignition anode a relatively large amount of energy is, therefore, required in the solenoid 18. Since, in accordance with applicant's present invention, this relatively large amount of energy is supplied from the alternating current source 10, the auxiliary rectifier apparatus is called upon to supply only the current required for the starting arc. The auxiliary rectifying system may, therefore, and preferably does comprise rectifier units as 35 and 36, of the dry type, for example copper-oxide rectifier units, these units being required to be only of relatively low current capacity.

In the embodiment of my invention illustrated in Fig. 2 the connections are essentially the same as in Fig. 1 except that in Fig. 2 reactors 45, 46 corresponding respectively to reactors 21, 23 of Fig. 1 are connected between the rectifiers 35, 36 and the holding anodes, and two groups of paralleled rectifiers are shown instead of the single rectifiers 35, 36 of Fig. 1. The internal resistance of the rectifiers 35, 36 in Fig. 2 serves the purpose of limiting the ignition current as does resistor 32 of the system shown in Fig. 1. While groups of rectifiers 35, 36 in parallel are shown in Fig. 2 it will be apparent that single rectifiers of adequate capacity may be substituted for the groups.

In Fig. 3 my invention is illustrated as embodied in an electric system similar to that shown in Fig. 1 but including an arc discharge device such as a 12-phase mercury arc rectifier 47 in which it is usually desirable to provide three excitation anodes instead of the two shown in connection with the 6-phase rectifier of Fig. 1. The rectifier 47 comprises a cathode 48, main power anodes 49, three excitation anodes 50 and ignition anode apparatus similar to the ignition anode 17, and solenoid 18 and spring 19 associated therewith, of Fig. 1.

The alternating-current excitation circuit in Fig. 3 includes the excitation anodes 50 connected through leads 51 to the three phases of a secondary 52 of a three-phase transformer 53 the primary of which may be connected to the alternating current circuit 10. The excitation circuit is completed from the neutral point of secondary 52 to the cathode 48 through a lead 54 in which is connected the operating coil 55 of a relay 56 the purpose of which will be explained hereinafter.

The direct-current ignition circuit in Fig. 3 in accordance with my invention includes the ignition anode 17, a lead 57, leads 58 including the heating coil 59 of a thermostatic switch 60 the purpose of which will be later explained, a resistor 61, three rectifiers 62, 63, 64 preferably of the copper oxide type adapted to be connected respectively to the different phases of secondary 52 through the leads 51 and the contacts 65, 66, 67 of a relay 68 adapted to close its contacts when its operating coil 69 is energized by current flowing through thermostatic switch 60 and contacts 70 of relay 56, lead 54 including the excitation coil 55 of relay 56, and cathode 48.

The circuits in Fig. 3 whereby the direct-current ignition arc is struck between the ignition anode 17 and the cathode 48 include the ignition solenoid 18 adapted to be connected through leads 71, the contacts 72 of a relay 73 and leads 74 to opposite terminals of the secondary 75 of a transformer 76 the primary of which may be connected to the alternating current circuit 10. The arc striking circuits of Fig. 3 further include contacts 77 of relay 68, adapted to connect operating winding 78 of relay 73 across the phases of secondary 52 through the rectifiers 62 to 64 and the contacts 65 to 67 of relay 68, when the latter relay is in closed position due to current in operating coil 69 supplied from secondary 75 through the thermostatic switch 60 and the contacts 70 of relay 56.

In operation of the starting system illustrated Fig. 1, assuming that an alternating potential, as from the circuit 10, is applied to the primary of transformer 25, and assuming that ignition anode 17 and the contacts of relays 29 and 40 are in the positions shown in the figure, then the rectifiers 35, 36 cause a direct-current potential to appear between the ignition anode 17 and the transformer mid-tap 27. At the same time direct-current energy through rectifiers 35, 36 is furnished the operating coil 41 of relay 40. This relay therefore closes its contacts 39 thereby closing the arc striking circuit including solenoid 18, and supplying energy from secondary 24 to solenoid 18, thereby causing the ignition anode 17 to be plunged into the mercury pool of cathode 14. This short-circuits the coil 41 of relay 40, permitting contacts 39 of this relay to open, thereby deenergizing solenoid 18 of ignition anode 17 which is then withdrawn from the mercury by spring 19.

At the moment the ignition anode 17 leaves the mercury surface a direct-current ignition arc is struck between the ignition anode 17 and the cathode 14. This ignition arc persists continuously until the alternating holding or excitation arc between the excitation anodes 16 and the cathode 14 has picked up. As soon as this pick-up of the excitation arc occurs and the arc in the excitation circuit including the holding anodes 16 is established, the current in this excitation circuit flowing in operating winding 28 of relay 29 is sufficient to cause this relay to operate, thereby opening contacts 44, 33 and 34 and completely deenergizing the direct-current ignition circuit and the arc striking circuit.

The rectifier system including rectifier 12 then operates with the alternating-current holding anodes 16 rectifying full wave to furnish ionization in the rectifier tank for the main power anodes 15. If for any reason the excitation arc between excitation anodes 16 and cathode 14 goes out the current in excitation winding 28 of relay 29 will drop out and the starting operation above described will be repeated.

In operation of the starting system illustrated in Fig. 3, let it be assumed that alternating potentials, as from alternating-current circuit 10, are impressed upon the primaries of transformers 53 and 76, and that the ignition anode 17, switch 60, and the contacts of relays 56, 68 and 73 are in the positions shown in the figure. Alternating-current energy is then furnished the operating coil 69 of relay 68 from secondary 75 of transformer 76 to close the contacts 77, 65, 66, 67 of this relay. The rectifiers 62, 63, 64 then cause a direct-current potential from three-phase transformer 53 to appear between the ignition anode 17 and the neutral point of secondary 52 of transformer 53. At the same time direct-current energy is furnished the operating coil 78 of relay 73 from the secondary 52 through the rectifiers 62, 63, 64. Relay 73 thereupon closes its contacts 72 thereby closing the arc striking circuit including solenoid 18, and permitting energy to be supplied from secondary 75 of transformer 76 to solenoid 18, thereby causing the ignition anode 17 to be plunged into the mercury pool of cathode 48. Contact of the anode 17 with the cathode 48 short-circuits the operating coil 78 of relay 73, permitting contacts 72 of this relay to open, thereby deenergizing solenoid 18 of ignition anode 17 which is then withdrawn from the mercury by spring 19.

At the moment the ignition anode 17 leaves the mercury surface, a direct-current ignition arc is struck between the ignition anode 17 and the cathode 48. This ignition arc persists continuously until the alternating holding or excitation arc between the excitation anodes 50 and the cathode 48 has picked up. As soon as this pick-up of the excitation arc occurs, and the arc in the excitation circuit including the holding anodes 50 and the secondary 52 of transformer 53 is established, the current in this excitation circuit flowing in operating winding 55 of relay 56 is sufficient to cause relay 56 to operate and to open its contacts 70 thereby deenergizing operating winding 69 of relay 68, whereupon contacts 77, 65, 66, 67 of relay 68 reopen, completely deenergizing the direct-current ignition circuit and the arc striking circuit.

The rectifier system of Fig. 3 including the 12-phase rectifier 47 then operates with the alternating-current holding anodes 50 rectifying 3-phase to furnish ionization for the main power anodes 49. If the excitation arc fails between excitation anodes 50 and cathode 48 the current in excitation winding 55 of relay 56 will drop out, permitting contacts 70 of this relay to close. The ignition anode 17, switch 60, and the contacts of relays 56, 68 and 73 will then be again in the starting position and the starting operation above described in connection with Fig. 3 will be repeated. If for any reason the excitation anodes 50 fail to pick up within a predetermined time interval following the establishing of the direct-current ignition arc between ignition anode 17 and cathode 48, thermostatic switch 60 opens thereby causing the current in energizing winding 69 of relay 68 to drop out. The contacts of relay 68 thereupon open, deenergizing the direct-current ignition circuit and preventing damage in this circuit from heating due to unduly prolonged flow of current therein.

What I claim as new and desire to secure by Letters Patent of the United States is:

1. In combination, an arc discharge apparatus including a cathode and ignition and excitation anodes, main power anodes, an alternating current source, an element adapted to actuate the ignition anode, connection means adapted to connect said source to said actuating element, means including a rectifying device external to said discharge apparatus and connected to said source to impress a direct potential on the ignition anode and to actuate said connection means to cause the ignition anode to make contact with the cathode, means including said alternating current source connected to the excitation anodes to supply ionization in said device for said main power anodes, and means to deenergize said connection means to cause the ignition anode to strike a direct-current arc at the cathode.

2. In combination, an arc discharge apparatus including a cathode and ignition and excitation anodes, an operating coil adapted to actuate the ignition anode, main power anodes, means connected to said cathode and main power anodes to impress an alternating potential therebetween, an alternating current source including a transformer, a relay having an operating coil to connect said transformer to said anode actuating coil, means including rectifying apparatus external to said discharge apparatus and connected to said transformer to impress a direct potential on the ignition anode and to actuate said relay to cause said ignition anode to make contact with said cathode, means including said transformer connected to the excitation anodes to supply ionization in said discharge apparatus for said main power anodes, and means to short-circuit said relay operating coil to cause the ignition anode to strike a direct current arc at the cathode.

3. In combination, an arc discharge apparatus including a cathode and an ignition anode, a plurality of excitation anodes, a plurality of main power anodes, means connected to the cathode and the main power anodes to impress an alternating potential therebetween, an alternating current source, means including rectifier apparatus external to said discharge apparatus and connected to said alternating current source to impress a direct-current potential between the ignition anode and the cathode, a second alternating current source, an element adapted to actuate the ignition anode, connection means adapted to connect said second alternating current source to said ignition anode actuating element, means including said current rectifying apparatus to actuate said connection means to cause the ignition anode to make momentary contact with the cathode, and means including said first-named alternating current source connected to the excitation anodes to supply ionization in said discharge apparatus for the main power anodes.

4. In combination, an arc discharge apparatus including a cathode and an ignition anode, a plurality of excitation anodes, a plurality of main power anodes, means connected to the cathode and the main power anodes to impress an alternating potential therebetween, an alternating current source including a transformer, means including rectifying apparatus external to said discharge apparatus and connected to said transformer to impress a direct-current potential between the ignition anode and the cathode, a second transformer connected to said current source, an operating coil adapted to actuate the ignition anode, connection means adapted to connect said second transformer to said ignition anode actuating coil, means including said rectifying apparatus to actuate said connection means to cause the ignition anode to make momentary contact with the cathode, and means including said first-named transformer connected to the excitation anodes to supply ionization in said discharge apparatus for said main power anodes.

5. In an electric system comprising an alternating-current circuit and a rectifier including a cathode, an ignition electrode, an element adapted to actuate the ignition electrode, and excitation electrodes, the method of starting said rectifier which includes deriving from said alternating-current circuit a direct-current potential independently of said rectifier, impressing said direct-current potential between the cathode and the ignition electrode, causing alternating current from said circuit to flow in said element to move the ignition electrode into contact with the cathode, forming a direct-current starting arc between the cathode and ignition electrode, impressing an alternating potential between the cathode and the excitation electrodes, and extinguishing the direct-current starting arc.

6. In an electric system comprising an alternating current circuit and a rectifier including a cathode, an ignition electrode, an operating coil adapted to actuate the ignition electrode, and excitation electrodes, the method of starting said rectifier which includes deriving from said alternating current circuit a direct-current potential independently of said rectifier, impressing said direct-current potential between the cathode and the ignition electrode, causing alternating current from said circuit to flow in said operating coil to cause momentary contact between the cathode and the ignition electrode to form a direct-current starting arc, impressing an alternating potential between the cathode and the excitation electrodes, and extinguishing the direct-current arc.

7. In combination, an arc discharge apparatus including a cathode, an ignition anode, excitation anodes, alternating-current means to excite said excitation anodes, an element adapted to actuate the ignition anode, means operative to cause flow in said element of alternating current from said alternating-current means to move the ignition anode into contact with the cathode, means to impress a direct potential between the ignition anode and the cathode, means to break said contact after a predetermined time interval to form a direct-current arc between the ignition anode and the cathode, means to deenergize the ignition anode, and additional means including a time responsive element to deenergize said ignition anode.

8. In combination, an arc discharge device including a cathode and ignition and excitation anodes, main power anodes, alternating-current means connected to the excitation anodes to supply ionization in said discharge device for the main power anodes, means including a rectifying device external to said arc discharge device to impress a direct potential on the ignition anode for starting said device, an operating coil adapted to actuate the ignition anode, means to cause flow in said operating coil of alternating-current from said alternating-current means to move the ignition anode into contact with the cathode, means to deenergize the ignition anode and additional means including a time responsive element to deenergize said ignition anode.

9. In combination, an arc discharge apparatus including a cathode and ignition and excitation anodes, main power anodes, an alternating current source, an element adapted to actuate the ignition anode, connection means adapted to connect said alternating current source to said actuating element, means including a current rectifying device of the dry rectifier type and connected to said source to impress a direct potential on the ignition anode and to actuate said connection means to cause the ignition anode to make contact with the cathode, means including said alternating current source connected to the excitation anodes to supply ionization in said device for said main power anodes, and means to deenergize said connection means to cause the ignition anode to strike a direct current arc at the cathode.

10. In combination, an arc discharge apparatus including a cathode and an ignition anode, a plurality of excitation anodes, a plurality of main power anodes, means connected to the cathode and the main power anodes to impress an alternating potential therebetween, an alternating current source, means including current rectifying apparatus of the dry rectifier type connected to said alternating current source to impress a direct-current potential between the ignition anode and the cathode, a second alternating current source, an element adapted to actuate the ignition anode, connection means adapted to connect said second alternating current source to said ignition anode actuating element, means including said current rectifying apparatus to actuate said connection means to cause the ignition anode to make momentary contact with the cathode, and means including said first-named alternating current source to supply ionization in said discharge apparatus for the main power anodes.

HAROLD T. SEELEY.